United States Patent
Zhang et al.

(10) Patent No.: US 12,173,943 B2
(45) Date of Patent: Dec. 24, 2024

(54) CONTROL METHOD AND SYSTEM FOR REFRIGERATION, OIL RETURN AND NOISE REDUCTION OF MULTI-SPLIT AIR-CONDITIONER

(71) Applicants: QINGDAO HAIER AIR-CONDITIONING ELECTRONIC CO., LTD., Qingdao (CN); HAIER SMART HOME CO., LTD., Qingdao (CN)

(72) Inventors: Ming Zhang, Qingdao (CN); Deyue Song, Qingdao (CN); Qiang Gao, Qingdao (CN); Haisheng Wang, Qingdao (CN); Dahai Lu, Qingdao (CN); Xiaodi Zhang, Qingdao (CN); Mingjie Zhou, Qingdao (CN)

(73) Assignees: QINGDAO HAIER AIR-CONDITIONING ELECTRONIC CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 659 days.

(21) Appl. No.: 17/294,398

(22) PCT Filed: Aug. 15, 2019

(86) PCT No.: PCT/CN2019/100677
§ 371 (c)(1),
(2) Date: May 15, 2021

(87) PCT Pub. No.: WO2020/098322
PCT Pub. Date: May 22, 2020

(65) Prior Publication Data
US 2022/0011032 A1    Jan. 13, 2022

(30) Foreign Application Priority Data
Nov. 16, 2018   (CN) .......................... 201811367792.0

(51) Int. Cl.
*F25B 49/02* (2006.01)
*F25B 13/00* (2006.01)
*F25B 31/00* (2006.01)

(52) U.S. Cl.
CPC ............ *F25B 49/022* (2013.01); *F25B 13/00* (2013.01); *F25B 31/004* (2013.01);
(Continued)

(58) Field of Classification Search
None
See application file for complete search history.

(56) References Cited

U.S. PATENT DOCUMENTS

2006/0101845 A1    5/2006   Jeong et al.

FOREIGN PATENT DOCUMENTS

| CN | 105157294 A | * 12/2015 |
| CN | 107575939 A | 1/2018 |

(Continued)

OTHER PUBLICATIONS

Translated_He (Year: 2015).*
Translated_Hirotoshi (Year: 2018).*
Translated_Li (Year: 2018).*

*Primary Examiner* — Elizabeth J Martin
*Assistant Examiner* — Samba Gaye
(74) *Attorney, Agent, or Firm* — Jiwen Chen; Joywin IP Law PLLC

(57) ABSTRACT

A control method and system for refrigeration, oil return and noise reduction of a multi-split air-conditioner, wherein the method includes: when the accumulative time that the frequency of a compressor is smaller than the set frequency threshold reaches the oil return cycle and a standby indoor unit exists, conducting an oil return running mode; resetting the accumulative time; starting counting the oil return running time; calculating the indoor unit starting load; deter- (Continued)

mining the opening degree of an expansion valve of the standby indoor unit according to the indoor unit starting load and whether there is anyone in a room where the standby indoor unit is located; controlling the compressor to run according to the set oil return frequency; and when the oil return running time reaches the oil return set time, exiting the oil return running mode, and conducting a normal refrigerating running mode.

6 Claims, 4 Drawing Sheets

(52) U.S. Cl.
CPC ... *F25B 2313/0233* (2013.01); *F25B 2500/16* (2013.01); *F25B 2600/0253* (2013.01); *F25B 2600/2513* (2013.01)

(56) References Cited

FOREIGN PATENT DOCUMENTS

| CN | 107576108 | A |   | 1/2018  |
|----|-----------|---|---|---------|
| CN | 105371531 | B | * | 2/2018  |
| CN | 108168169 | A |   | 6/2018  |
| CN | 108489150 | A |   | 9/2018  |
| JP | 2009243719 | A |   | 10/2009 |
| JP | 2018071893 | A | * | 5/2018  |

* cited by examiner

CONTROL METHOD AND SYSTEM FOR REFRIGERATION, OIL RETURN AND NOISE REDUCTION OF MULTI-SPLIT AIR-CONDITIONER

This is a U.S. national stage application of PCT Application No. PCT/CN2019/100677 under 35 U.S.C. 371, filed Aug. 15, 2019 in Chinese, claiming priority to Chinese Patent Applications No. 201811367792.0, filed Nov. 16, 2018, all of which are hereby incorporated by reference.

TECHNICAL FIELD

The present invention belongs to the technical field of air conditioning, and specifically relates to a control method and system for refrigeration, oil return and noise reduction of multi-split air conditioner.

BACKGROUND

With the improvement of living standards, more and more families intend to purchase a multi-split air conditioner; those customers pay more attention not only to its energy saving performance, but also to how much noise it makes as working. Noises at an indoor unit end mainly come from two sources: 1. sound generated by a built-in fan driven by a motor and 2. a refrigerant throttling sound generated as the refrigerant flowing through an electronic expansion valve with a certain degree of opening, such as when an outdoor unit performs an oil return operation in the course of normal running which can cause disturbance to users around those power-off indoor units. The prior art does not find a feasible solution to reduce the sound.

SUMMARY OF THE INVENTION

The invention provides a control method to reduce noise for oil-return operation in a cooling mode of a multi-split air conditioner, which is beneficial to reducing the influence of the refrigerant throttle sound from the standby indoor units on users in the course of oil-return operation.

To solve the above technical problems, the present invention is implemented by the following technical solutions:

A control method to reduce noise for oil-return operation in a cooling mode of a multi-split air conditioner, wherein the multi-split air conditioner includes an outdoor unit and a plurality of indoor units and each liquid pipe of the indoor unit is further provided with an electronic expansion valve.

the control method is performed as the multi-split air conditioner working in a cooling mode, the method includes: determining if a total time when a running frequency of the compressor less than a preset frequency threshold reaches an oil-return operation interval, and determining if there are one or more standby indoor units; if yes, entering into an oil-return operation and performing:

(1) resetting the total time t1 and starting to count an oil-return operation running time;
(2) calculating a load of switch-on indoor units §, wherein §=On_HP/All_HP, On_HP is a total capacity of switch-on indoor units and All_HP is a total capacity of all indoor units;
(3) determining the opening degree of the electronic expansion valve of the standby indoor units based on the load of switch-on indoor units § and whether there are people in the room where the indoor unit is arranged:
(31) if a first setting value<§<100%:
further if nobody is in a room where the standby indoor unit is in, to adjust the opening degree of the electronic expansion valve therein to a preset oil-return opening degree; further if someone is in a room where the standby indoor unit is in, to close the electronic expansion valve;
(32) if a second setting value≤§<the first setting value:
further if nobody is in a room where the standby indoor unit is in, to adjust the opening degree of the electronic expansion valve therein to a preset oil-return opening degree; further if someone is in a room where the standby indoor unit is in, to close the electronic expansion valve, to shorten an oil-return operation interval and to maintain an oil-return operation set time unchanged;
(33) if §<the second setting value:
further if nobody is in a room where the standby indoor unit is in, to adjust the opening degree of the electronic expansion valve therein to a preset oil-return opening degree; further if someone is in a room where the standby indoor unit is in, to adjust the opening degree of the electronic expansion valve therein to the preset oil-return opening degree, to activate a fan in the standby indoor unit and enable the fan to work at a low-speed range, to maintain the oil-return operation interval unchanged and to shorten the oil-return operation set time; wherein the first setting value>the second setting value;
(4) controlling the compressor running at a set oil return frequency;
(5) switching from the oil return operation to the normal cooling operation mode when the oil return operation lasts for the oil-return operation set time.

Further, a human sensor module is configured to determine whether there are people in a room where an indoor unit is installed.

Further, the first setting value is 70%~80% and the second setting value is 40%~60%.

Further, the preset oil-return opening degree is set to 20% to 30% of a full opening of the electronic expansion valve.

Further, the oil-return operation interval is shortened to 70%~90% of its own.

Further, the oil-return operation set time is shortened to 40%~60% of its own.

A control system to reduce noise for oil-return operation in a cooling mode of a multi-split air conditioner, wherein the multi-split air conditioner includes an outdoor unit and a plurality of indoor units, wherein each indoor unit is provided with a liquid pipe and each liquid pipe of the indoor unit is further provided with an electronic expansion valve, characterized in that the control system includes: a determining module configured to determine if a total time when a running frequency of the compressor less than a preset frequency threshold reaches an oil-return operation interval, and determining if there are one or more standby indoor units; a timing module configured to reset the total time and start to count an oil-return operation running time; a load calculation module configured to calculate a load of switch-on indoor units §, wherein §=On_HP/All_HP, On_HP is a total capacity of switch-on indoor units and All_HP is a total capacity of all indoor units; an opening degree control module, which is configured to determine the opening degree of the electronic expansion valve of the standby indoor units based on the load of switch-on indoor units and whether there are people in the room where the indoor unit is arranged; further configured to: if a first setting value<§<100%: further if nobody is in a room where the standby indoor unit is in, to adjust the opening degree of the electronic expansion valve therein to a preset oil-return opening degree; further if someone is in a room where the standby indoor unit is in, to close the electronic expansion valve; if a second setting value≤§<the first setting value: further if nobody is in a room where the standby indoor unit is in, to adjust the opening degree of the electronic expansion valve therein to a preset oil-return opening degree; further if someone is in a room where the standby indoor unit is in, to close the electronic expansion valve, to shorten an oil-return operation interval and to maintain an oil-return operation set time unchanged; if §<the second setting value: further if nobody is in a room where the standby indoor unit is in, to adjust the opening degree of the electronic expansion valve therein to a preset oil-return opening degree; further if someone is in a room where the standby indoor unit is in, to adjust the opening degree of the electronic expansion valve therein to the preset oil-return opening degree, to activate a fan in the standby indoor unit and enable the fan to work at a low-speed range, to maintain the oil-return operation interval unchanged and to shorten the oil-return operation set time; wherein the first setting value>the second setting value; and a compressor control module configured to control the compressor running at a set oil return frequency Further, the system further includes a human sensor module configured to determine whether there is a person in the room where the standby indoor unit is located.

Further, the first setting value is 70%~80%, the second setting value is 40%~60%, and the preset oil-return opening degree is set to 20% to 30% of a full opening of the electronic expansion valve.

Further, the oil-return operation interval is shortened to 70%~90% of its own and the oil-return operation set time is shortened to 40%~60% of its own.

Beneficial Effect

Compared with the prior art, the advantages and positive effects of the present invention are: the control method and system to reduce noise for oil-return operation in a cooling mode of a multi-split air conditioner of the present invention includes: entering into an oil-return operation as the total time when the running frequency of the compressor less than the preset frequency threshold reaching the oil-return operation interval and some of the indoor units are in standby; resetting the total time; counting an oil return operation running time; calculating a load of switch-on indoor units; determining opening degrees of the electronic expansion valves provided in indoor units according as there are people in the room where the indoor unit is arranged; controlling the compressor working at an oil return frequency; switching the multi-split air conditioner from the oil return operation to the normal cooling operation mode when the oil return operation lasts for the oil-return operation set time; the control method disclosed by the present invention could ensure a satisfied oil-return effect and also could reduce the influence of the refrigerant throttle sound from the standby indoor units on users in the course of oil-return operation.

After reading the specific embodiments of the present invention in conjunction with the accompanying drawings, other features and advantages of the present invention will become clearer.

BRIEF DESCRIPTION OF THE DRAWINGS

FIG. 1 is a structure diagram of a multi-split air conditioner in which a control method to reduce noise for oil-return operation in a cooling mode of a multi-split air conditioner according to one aspect of the present invention is applied to;

DETAILED DESCRIPTION OF THE EMBODIMENTS

The present invention will be further described in detail below with reference to the accompanying drawings and embodiments.

A multi-split air conditioner includes an outdoor unit and a plurality of indoor units, wherein each indoor unit is provided with a liquid pipe respectively connected to a liquid pipe provided on the outdoor unit; each liquid pipe of the indoor unit is further provided with an electronic expansion valve, which is configured to adjust an amount of refrigerant flowing into the indoor unit.

Figure 1:
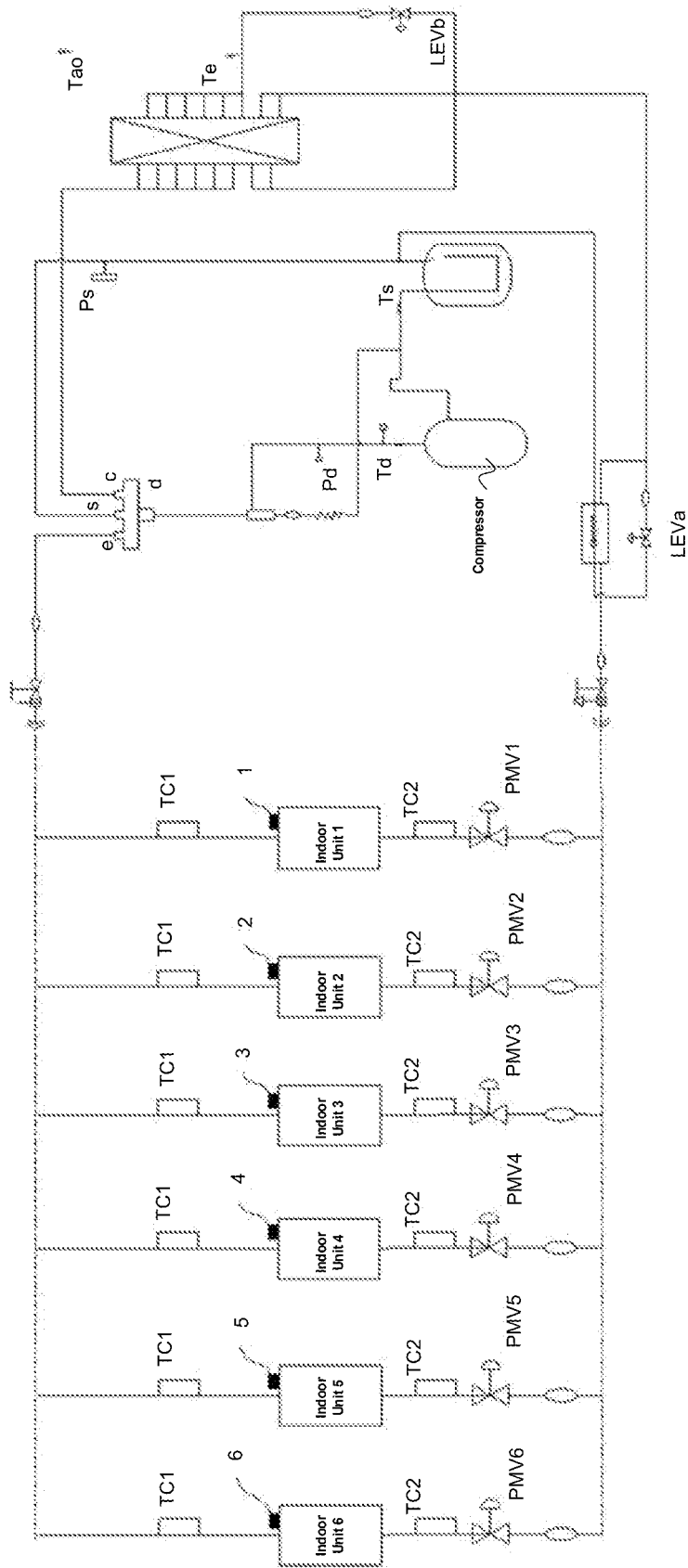

For example, as shown in FIG. 1, an electronic expansion valve PMV1 is arranged on a liquid pipe of an indoor unit 1, an electronic expansion valve PMV2 is arranged on a liquid pipe of an indoor unit 2, an electronic expansion PMV3 is arranged on a liquid pipe of an indoor unit 3, an electronic expansion PMV4 is arranged on a liquid pipe of an indoor unit 4, an electronic expansion PMV5 is arranged on a liquid pipe of an indoor unit 5, an electronic expansion PMV6 is arranged on a liquid pipe of an indoor unit 6, . . . , and an electronic expansion PMVn is arranged on a liquid pipe of an indoor unit n, wherein n represents the number of indoor unit. When the multi-split air conditioner working in a cooling mode, opening degrees of the electronic expansion valves inside switch-on indoor units are automatically adjusted on the basis of superheat degree and the electronic expansion valves inside standby indoor units are closed.

A human sensor module is installed on each indoor unit and the human sensor module will automatically function as powering on to determine whether there are people in the room. For example, a human sensor module 1 is provided on the indoor unit 1, a human sensor module 2 is provided on the indoor unit 2, a human sensor module 3 is provided on the indoor unit 3, a human sensor module 4 is provided on the indoor unit 4, a human sensor module 5 is provided on the indoor unit 5, a human sensor module 6 is provided on the indoor unit 6, . . . , and a human sensor module n is provided on the indoor unit n.

Figure 2:
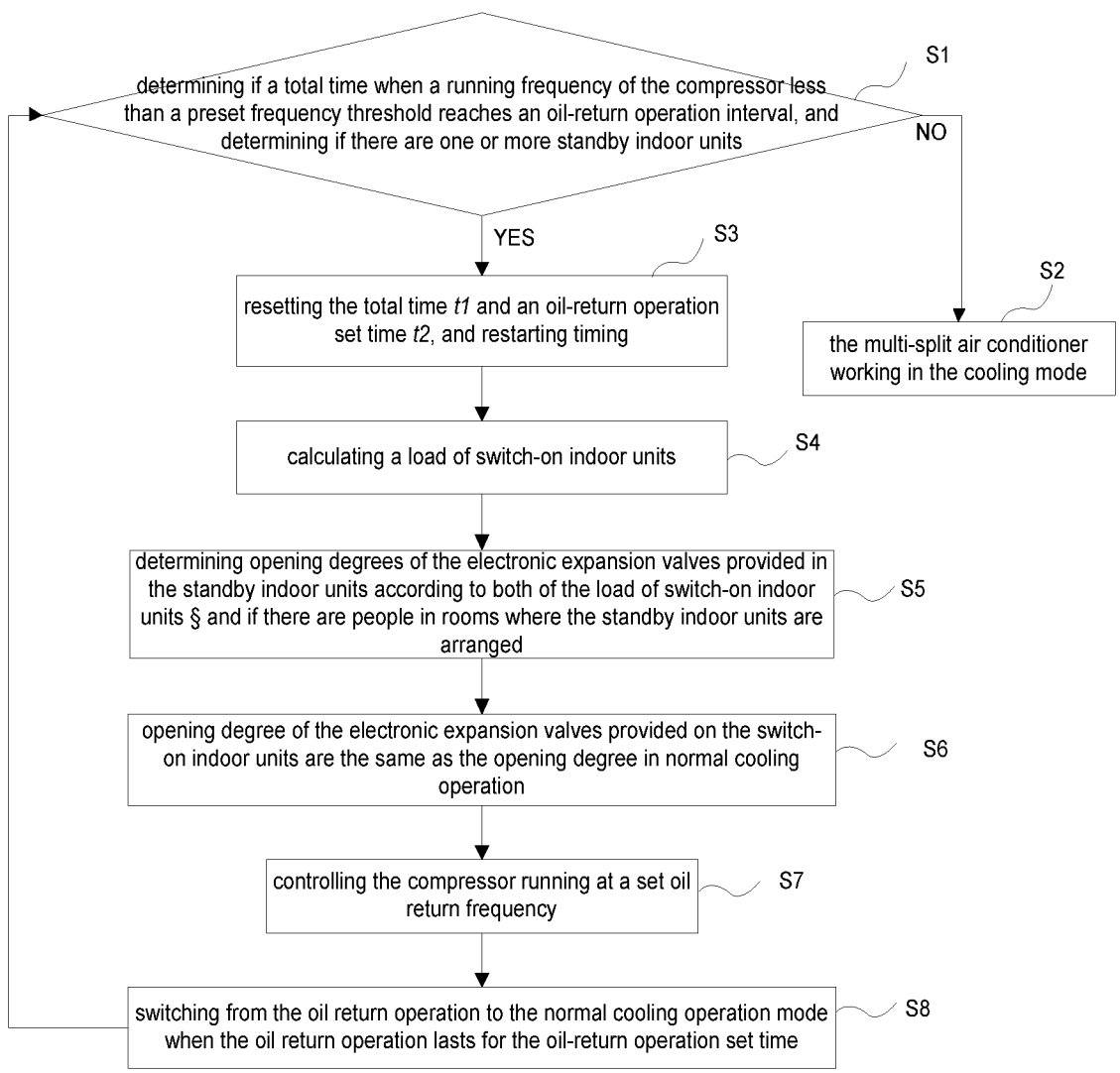
FIG. 2 is a flow chart of a control method to reduce noise for oil-return operation in a cooling mode of a multi-split air conditioner according to one aspect of the present invention.

A control method to reduce noise for oil-return operation in a cooling mode of a multi-split air conditioner disclosed by the present invention, which is performed as the multi-split air conditioner working in a cooling mode, includes the following steps, shown in FIG. 2.

Step S1: determining if a total time when a running frequency of the compressor less than a preset frequency threshold reaches an oil-return operation interval, and determining if there are one or more standby indoor units.

If no, performing Step S2: the multi-split air conditioner working in the cooling mode. To be specific, if the total time when a running frequency of the compressor less than the preset frequency threshold does not reach the oil-return operation interval, normal cooling operation is maintained.

If neither indoor unit is in standby, namely all of the indoor units are functioning, there is no need for oil-return operation because the entire refrigerant pipeline of the multi-split air conditioner is communicated in which refrigerant is circulating with lubricating oil. Therefore, the multi-split air conditioner could maintain normal cooling operation under this circumstance.

If some of the indoor units are in standby, the lubricating oil may collect and linger in refrigerant pipes provided inside the standby indoor units and could not circulate; and the more standby indoor units, the more lubricating oil remains in, and the less lubricating oil could be used to lubricate the compressor; and accordingly, oil return operation is essential. The oil-return operation starts if the total time when the running frequency of the compressor less than the preset frequency threshold reaching the oil-return operation interval.

If yes, namely the total time when the running frequency of the compressor less than the preset frequency threshold reaches the oil-return operation interval, the following steps are performed as entering into the oil-return operation.

Step S3: resetting the total time t1 and an oil-return operation running time t2, and restarting timing.

Step S4: Calculating a load of switch-on indoor units §: §=On_HP/All_HP.

Wherein On_HP is a total capacity of switch-on indoor units and All_HP is a total capacity of all indoor units.

$$All\_HP = P1 + P2 + P3 +, \ldots, + Pn;$$

wherein P1 represents the capacity of the indoor unit 1, P2 represents the capacity of the indoor unit 2, P3 represents the capacity of the indoor unit 3, . . . , and Pn represents the capacity of the indoor unit n.

As an example, if the indoor unit 1 and the indoor unit 2 are switched on, On_HP=P1+P2.

$$\S = On\_HP/All\_HP = (P1+P2)/(P1+P2+P3+, \ldots, +Pn).$$

If all of the indoor units are switched on, §=100%.

Step S5: determining opening degrees of the electronic expansion valves provided in the standby indoor units according to both of the load of switch-on indoor units § and if there are people in rooms where the standby indoor units are arranged.

Figure 3:
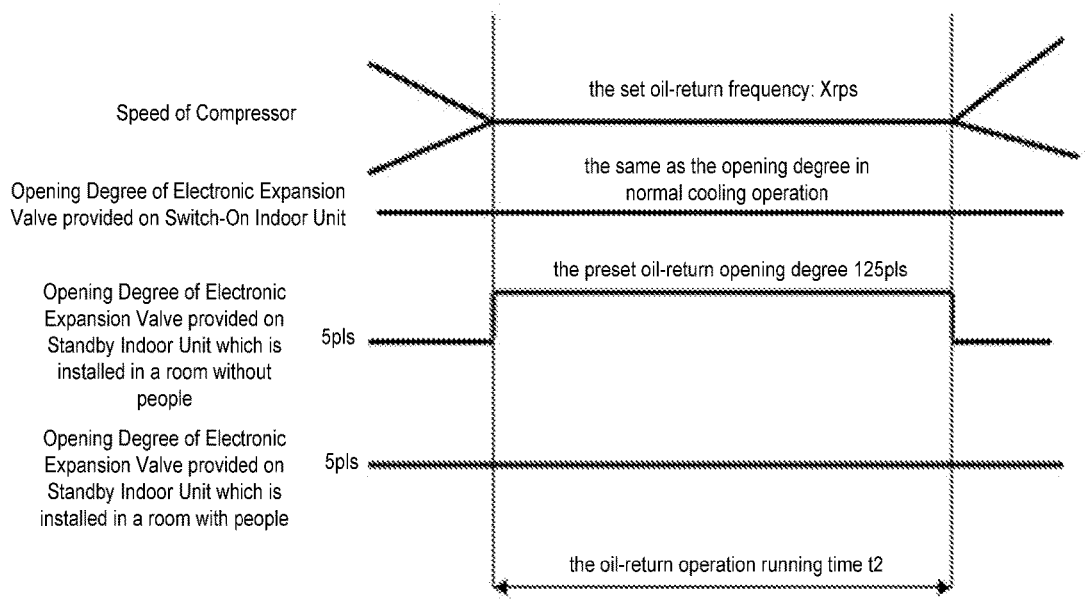
FIG. 3 is a schematic diagram of an oil-return operation shown in FIG. 2.

The Step S5 specifically includes:

S51: performing steps in the following paragraphs if a first setting value<§<100%. FIG. 3 is a sequence diagram of an oil-return operation could be referred to under a current condition where actually some indoor units are in standby but the proportion puts less weight on so the lubricating oil collected in the multi-split refrigerant pipeline does not impact on the overall performance.

(1) Further if a human sensor module provided on a standby indoor unit detects that nobody is in a room where the standby indoor unit is in, the opening degree of the electronic expansion valve therein is adjusted to a preset oil-return opening degree to prevent the lubricating oil from being collected in the pipeline of the standby indoor unit and further causing lack of lubricating oil in the compressor. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

(2) Further if the human sensor module provided on a standby indoor unit detects that someone is in a room where the standby indoor unit is in, the electronic expansion valve therein is closed so as to prevent a refrigerant throttling sound from the opening of the electronic expansion valve, further to avoid deterioration of user experience.

(3) Further maintaining the oil-return operation interval and an oil-return operation set time unchanged.

Figure 4:
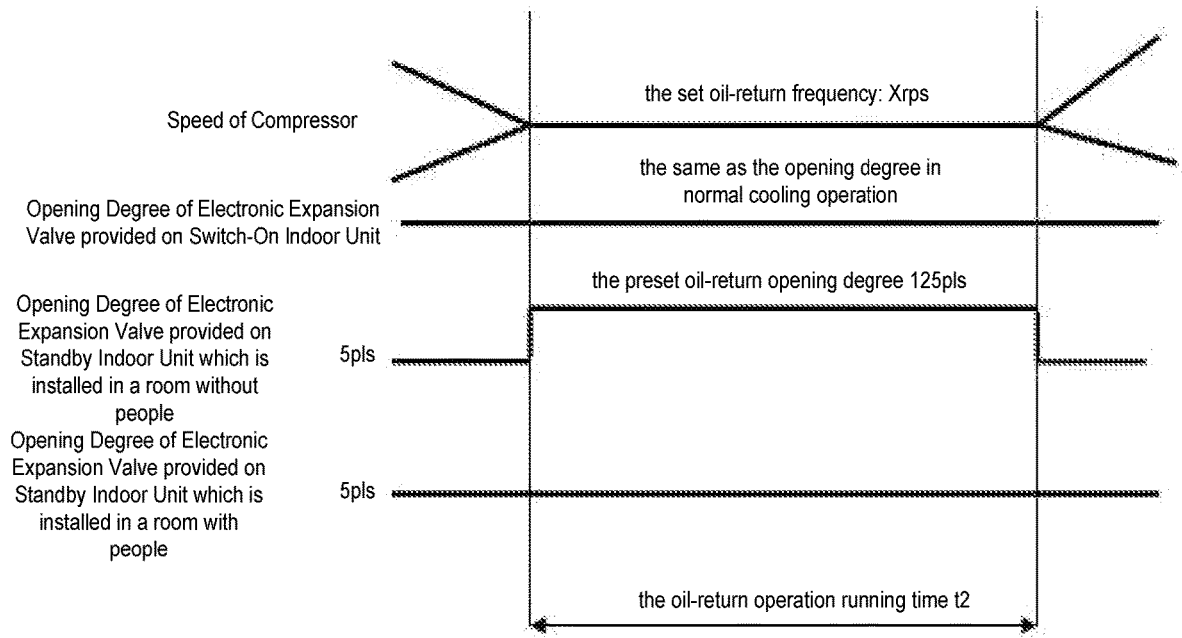
FIG. 4 is a schematic diagram of an oil-return operation shown in FIG. 2.

S52: performing steps in the following paragraphs if a second setting value≤§<the first setting value. FIG. 4 is a sequence diagram of an oil-return operation could be referred to under a current condition in which more indoor units are in standby, compared with the condition described in S51, and some lubricating oil has collected in the pipeline of the standby indoor units, which is incapable of flowing freely, so a possible situation that the compressor is running out of lubricating oil should be avoided.

(1) Further if a human sensor module provided on a standby indoor unit detects that nobody is in a room where the standby indoor unit is in, the opening degree of the electronic expansion valve therein is adjusted to a preset oil-return opening degree to prevent the lubricating oil from being collected in the pipeline of the standby indoor unit and further causing lack of lubricating oil in the compressor. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

(2) Further if the human sensor module provided on the standby indoor unit detects that someone is in a room where the standby indoor unit is in, the electronic expansion valve therein is closed so as to prevent a refrigerant throttling sound from the opening of the electronic expansion valve, further to avoid deterioration of user experience; and in the meanwhile shortening the oil-return operation interval and maintaining the oil-return operation set time unchanged.

For example, an original oil-return operation interval T is 4 hours and the oil-return operation set time is 5 minutes. That is to say, each time that the total time when the running frequency of the compressor less than the preset frequency threshold reaches the oil-return operation interval, the oil return operation is performed once for 5 minutes. The oil-return operation interval is shortened that is accompanied by an increase of the frequency of the compressor as performing the oil-return operation to ensure the subsequent oil return effect.

In the present embodiment, it is preferably to cut the oil-return operation interval down to its 70% to 90%. As an example, the original oil-return operation interval T may be set as 4 hours, and it could be shortened to a value in a range from 2.8 hours to 3.6 hours. The shortened oil-return operation interval in the preferable range could guarantee a proper oil-return effect, and furthermore it could avoid that the multi-split air conditioner enters into an oil-return operation too frequent to undermine normal cooling operation. Therefore, the range configured to adjust the oil-return operation interval ensures a subsequent oil-return effect and also prevents a negative influence on the normal cooling operation of the multi-split air conditioner. As a preferred embodiment, the oil-return operation interval is shortened to its 80% in the present step.

Figure 5:
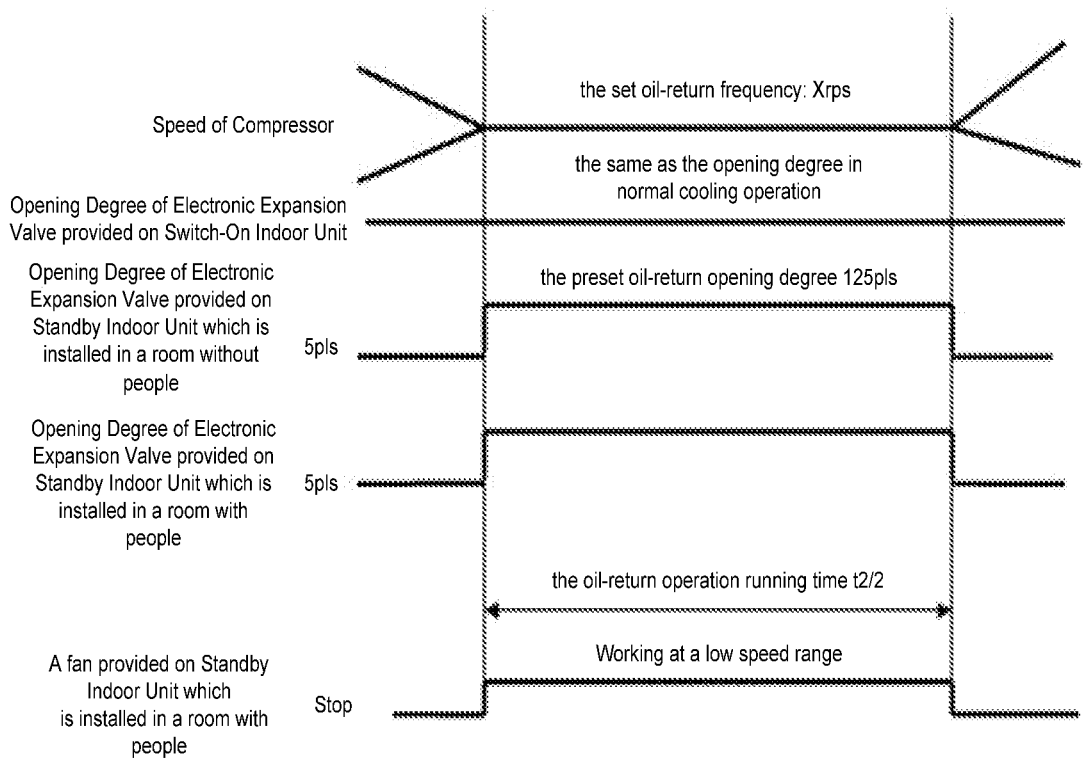
FIG. 5 is a schematic diagram of an oil-return operation shown in FIG. 2.

S53: performing steps in the following paragraphs if §<a second setting value. FIG. 5 is a sequence diagram of an oil-return operation could be referred to under a current condition where most of indoor units are in standby and most lubricating oil collects in the pipeline of the standby indoor units incapable of circulation as required, so a probable situation that the compressor is running out of lubricating oil should be prevented.

(1) Further if a human sensor module provided on a standby indoor unit detects that nobody is in a room where the standby indoor unit is in, the opening degree of the electronic expansion valve therein is adjusted to a preset oil-return opening degree to prevent the lubricating oil from being collected in the pipeline of the standby indoor unit and further causing lack of lubricating oil in the compressor. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

(2) Further if the human sensor module provided on the standby indoor unit detects that someone is in a room where the standby indoor unit is in, the opening degree of the electronic expansion valve therein is adjusted to the preset oil-return opening degree to prevent the lubricating oil from being collected in the pipeline of the standby indoor unit and further casing lack of lubricating oil in the compressor; a fan in the standby indoor unit is activated and works at a low-speed range to mask the refrigerant throttling sound and reduce the impact of noise on users; the oil-return operation interval is maintained unchanged and the oil-return operation set time is shortened.

A fan in each indoor unit could work at the low speed range, also could work at a medium speed range and a high speed range.

For example, an original oil-return operation interval T is 4 hours and the oil-return operation set time is 5 minutes. That is to say, each time that the total time when the running frequency of the compressor less than the preset frequency threshold reaches the oil-return operation interval, the oil return operation is performed once for 5 minutes.

Since the opening degree of each electronic expansion valve provided on the standby indoor units is regulated to the preset oil-return opening degree, the oil-return operation set time is shortened, as an example, to 4 minutes could not only ensure oil-return effect, but also avoid drastically impacting on cooling operation.

In the present embodiment, it is preferably to cut the oil-return operation set time down to its 40% to 60%. The shorted oil-return operation set time in this preferable range could guarantee a proper oil-return effect, and also could prevent normal cooling operation from being undermined. Therefore, the range configured to adjust the oil-return operation set time ensures oil-return effect and also prevents a negative influence on the normal cooling operation of the multi-split air conditioner. As a preferred embodiment, the oil-return operation set time is shortened to its 50% in the present step;

wherein the first setting value>the second setting value.

Step S6: opening degree of the electronic expansion valves provided on the switch-on indoor units are the same as the opening degree in normal cooling operation so as to maintain cooling effect as much as possible.

Step S7: controlling the compressor running at a set oil return frequency.

The set oil return frequency is greater than the set frequency threshold. For example, the oil return frequency is set to 70 rps~75 rps and the set frequency threshold to 40 rps.

Step S8: switching from the oil return operation to the normal cooling operation mode when the oil return operation lasts for the oil-return operation set time.

In the control method to reduce noise for oil-return operation in a cooling mode of a multi-split air conditioner disclosed by the present embodiment, the following steps are provided: entering into an oil-return operation as the total time when the running frequency of the compressor less than the preset frequency threshold reaching the oil-return operation interval and some of the indoor units are in standby; resetting the total time; counting an oil return operation running time; calculating a load of switch-on indoor units; determining opening degrees of the electronic expansion valves provided in indoor units according as there are people in the room where the indoor unit is arranged; controlling the compressor working at an oil return frequency; switching the multi-split air conditioner from the oil return operation to the normal cooling operation mode when the oil return operation lasts for the oil-return operation set time; the control method disclosed by the present invention could ensure a satisfied oil-return effect and also could enable the lubricating oil to return to the compressor as soon as possible, and further could avoid a loss on the cooling effect of the multi-split air conditioner.

In the present invention, the preset oil-return opening degree is set to 20% to 30% of a full opening of the electronic expansion valve. For example, if the full opening of each electronic expansion valve provided on the indoor unit is 480 pls, the preset oil-return opening degree is set in a range from 96 pls to 144 pls. The preferable range of the preset oil-return opening degree could ensure a satisfied oil-return effect, and also could enable the lubricating oil to return to the compressor as soon as possible, and further could avoid a loss on the cooling effect of the multi-split air conditioner.

In the present embodiment, the first setting value is 70%~80% and the second setting value is 40%~60%. Preferably, the first setting value is 75% and the second setting value is 50%.

Specifically, (1) If 75%<§<100%:

Further if a human sensor module provided on a standby indoor unit detects that nobody is in a room where the standby indoor unit is in, the opening degree of the electronic expansion valve therein is adjusted to 20%~30% of the full opening degree. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

Further if the human sensor module provided on a standby indoor unit detects that someone is in a room where the standby indoor unit is in, the electronic expansion valve therein is closed so as to prevent a refrigerant throttling sound from the opening of the electronic expansion valve, further to avoid deterioration of user experience.

Further the oil-return operation interval and the oil-return operation set time are unchanged.

(2) If 50%<§<75%:

Further if a human sensor module provided on a standby indoor unit detects that nobody is in a room where the standby indoor unit is in, the opening degree of the electronic expansion valve therein is adjusted to 20%~30% of the full opening degree. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

Further if the human sensor module provided on the standby indoor unit detects that someone is in a room where the standby indoor unit is in, the electronic expansion valve therein is closed so as to prevent a refrigerant throttling sound from the opening of the electronic expansion valve, further to avoid deterioration of user experience; and in the meanwhile shortening the oil-return operation interval to 80% of its own and maintaining the oil-return operation set time unchanged.

(3) If §<50%:

Further if a human sensor module provided on a standby indoor unit detects that nobody is in a room where the standby indoor unit is in, the opening degree of the electronic expansion valve therein is adjusted to 20%~30% of the full opening. These arrangements could guarantee a satisfied oil-return effect that a proper amount of lubricating oil returning to the compressor as required, and there is no need to take further action on the refrigerant throttling sound caused by the opening of the electronic expansion valve, which will not bring about disturbance to users because nobody is in the room.

Further if the human sensor module provided on the standby indoor unit detects that someone is in a room where the standby indoor unit is in, the opening degree of the electronic expansion valve therein is adjusted to 20%~30% of the full opening ensure a proper amount of the lubricating oil returning to the compressor; a fan in the standby indoor unit is activated and works at a low-speed range to mask the refrigerant throttling sound and reduce the impact of noise on users; the oil-return operation interval is maintained unchanged and the oil-return operation set time is shortened to 50% of its own.

The above preferable ranges for the first setting value and the second setting value could accurately evaluate the load of switch-on indoor units, further provides a criterion to adjust the opening degree of the electronic expansion valve provided in the standby indoor units. Accordingly, a satisfied oil return effect could be achieved without severe impact on the cooling effect.

Based on the control method to reduce noise for oil-return operation in a cooling mode of a multi-split air conditioner, the present invention further discloses a control system to reduce noise for oil-return operation in a cooling mode of a multi-split air conditioner, wherein the multi-split air conditioner includes an outdoor unit and a plurality of indoor units, wherein each indoor unit is provided with a liquid pipe and each liquid pipe of the indoor unit is further provided with an electronic expansion valve. The control system includes:

A determining module, which is configured to determine if a total time when a running frequency of the compressor less than a preset frequency threshold reaches an oil-return operation interval, and determining if there are one or more standby indoor units;

A timing module, which is configured to reset the total time and start to count an oil-return operation running time;

A load calculation module, which is configured to calculate a load of switch-on indoor units §, wherein §=On_HP/All_HP, On_HP is a total capacity of switch-on indoor units and All_HP is a total capacity of all indoor units;

An opening degree control module, which is configured to determine the opening degree of the electronic expansion valve of the standby indoor units based on the load of switch-on indoor units § and whether there are people in the room where the indoor unit is arranged; to be specific, configured to:

if a first setting value<§<100%: further if nobody is in a room where the standby indoor unit is in, to adjust the opening degree of the electronic expansion valve therein to a preset oil-return opening degree; further if someone is in a room where the standby indoor unit is in, to close the electronic expansion valve;

if a second setting value≤§<the first setting value: further if nobody is in a room where the standby indoor unit is in, to adjust the opening degree of the electronic expansion valve therein to a preset oil-return opening degree; further if someone is in a room where the standby indoor unit is in, to close the electronic expansion valve, to shorten an oil-return operation interval and to maintain an oil-return operation set time unchanged;

if §<the second setting value: further if nobody is in a room where the standby indoor unit is in, to adjust the opening degree of the electronic expansion valve therein to a preset oil-return opening degree; further if someone is in a room where the standby indoor unit is in, to adjust the opening degree of the electronic expansion valve therein to the preset oil-return opening degree, to activate a fan in the standby indoor unit and enable the fan to work at a low-speed range, to maintain the oil-return operation interval unchanged and to shorten the oil-return operation set time; wherein the first setting value>the second setting value;

a compressor control module, which is configured to control the compressor running at a set oil return frequency;

and a human sensor module, which is configured to determine whether there is a person in the room where the standby indoor unit is located.

The first setting value is 70%~80%, the second setting value is 40%~60%, and the preset oil-return opening degree is set to 20% to 30% of a full opening of the electronic expansion valve.

The shortened oil-return operation interval means that the oil-return operation interval is shortened to 70%~90% of its own, and the shortened oil-return operation set time means that the oil-return operation set time is shortened to 40%~60% of its own.

The detailed working process of the control system to reduce noise for oil-return operation in a cooling mode of a multi-split air conditioner has been explained in accompany with the above control method to reduce noise for oil-return operation in a cooling mode of a multi-split air conditioner and will not be repeated.

The control system to reduce noise for oil-return operation in a cooling mode of a multi-split air conditioner disclosed by the present embodiment comprises: entering into an oil-return operation as the total time when the running frequency of the compressor less than the preset frequency threshold reaching the oil-return operation interval and some of the indoor units are in standby; resetting the total time; counting an oil return operation running time; calculating a load of switch-on indoor units; determining opening degrees of the electronic expansion valves provided in indoor units according as there are people in the room where the indoor unit is arranged; controlling the compressor working at an oil return frequency; switching the multi-split air conditioner from the oil return operation to the normal cooling operation mode when the oil return operation lasts for the oil-return operation set time; the control method disclosed by the present invention could ensure a satisfied oil-return effect and also could enable the lubricating oil to return to the compressor as soon as possible, and further could avoid a loss on the cooling effect of the multi-split air conditioner.

The above embodiments are only used to illustrate the technical solutions of the present invention, but not to limit them. Although the present invention has been described in detail with reference to the foregoing embodiments, to ordinary skills in the art, it can still be modified or some of the technical features are equivalently replaced; and these modifications or replacements do not deviate the essence of the corresponding technical solutions from the spirit and scope of the technical solutions claimed by the present invention.

The invention claimed is:

1. A control method to reduce noise for an oil-return operation in a cooling mode of a multi-split air conditioner, the multi-split air conditioner includes an outdoor unit and a plurality of indoor units, wherein each indoor unit is provided with a liquid pipe and each liquid pipe of the indoor units is further provided with an electronic expansion valve; wherein the control method is performed as the multi-split air conditioner is working in the cooling mode, the method includes:
   determining that a total time when a running frequency of a compressor less than a preset frequency reaches an oil-return operation interval, and determining that there are one or more standby indoor units; entering into the oil-return operation and performing:
   (1) resetting the total time t1 and starting to count an oil-return operation running time;
   (2) calculating a load of switch-on indoor units §, wherein §=On_HP/All_HP, On_HP is a total capacity of switch-on indoor units and All_HP is a total capacity of all indoor units;
   (3) determining an opening degree of the electronic expansion valve of the standby indoor units based on the load of switch-on indoor units § and whether there are people in a room where one of the standby indoor units is arranged;
   (31) when a first setting value<§<100%:
      further when nobody is in the room where the standby indoor unit is in, to adjust the opening degree of the electronic expansion valve therein to a preset oil-return opening degree of the electronic expansion valve;
      further when someone is in the room where the standby indoor unit is in, to close the electronic expansion valve;
   (32) when a second setting value≤§<the first setting value:
      further when nobody is in the room where the standby indoor unit is in, to adjust the opening degree of the electronic expansion valve therein to the preset oil-return opening degree;
      further when someone is in the room where the standby indoor unit is in, to close the electronic expansion valve, to shorten the oil-return operation interval and to maintain an oil-return operation set time unchanged;
   (33) when §<the second setting value:
      further when nobody is in the room where the standby indoor unit is in, to adjust the opening degree of the electronic expansion valve therein to the preset oil-return opening degree;
      further when someone is in the room where the standby indoor unit is in, to adjust the opening degree of the electronic expansion valve therein to the preset oil-return opening degree, to activate a fan in the standby indoor unit and enable the fan to work at a low-speed range, to maintain the oil-return operation interval unchanged and to shorten the oil-return operation set time; wherein the first setting value>the second setting value;
   (4) controlling the compressor running at a set oil return frequency;
   (5) switching from the oil return operation to a normal cooling operation mode when the oil return operation lasts for the oil-return operation set time.

2. The control method according to claim 1, wherein a human presence sensor is configured to determine whether there are people in a room where an indoor unit is installed.

3. The control method according to claim 1, wherein the first setting value is 70%~80% and the second setting value is 40%~60%.

4. The control method according to claim 1, wherein the preset oil-return opening degree is set to 20% to 30% of a full opening of the electronic expansion valve.

5. The control method according to claim 1, wherein the oil-return operation interval is shortened to 70%~90% of its own.

6. The control method according to claim 1, wherein the oil-return operation set time is shortened to 40%~60% of its own.

* * * * *